United States Patent [19]

Donnerstag

[11] Patent Number: 5,081,560
[45] Date of Patent: Jan. 14, 1992

[54] LOAD CENTER ENCLOSURE

[75] Inventor: Leonard Donnerstag, Atlanta, Ga.

[73] Assignee: Siemens Energy & Automation, Inc., Alpharetta, Ga.

[21] Appl. No.: 589,233

[22] Filed: Sep. 27, 1990

[51] Int. Cl.⁵ .............................................. H02B 1/04
[52] U.S. Cl. .................... 361/358; 361/346; 361/355; 361/361
[58] Field of Search ............... 361/341, 346, 353–363, 361/376, 391, 415; 211/41

[56] References Cited

U.S. PATENT DOCUMENTS

| | | | |
|---|---|---|---|
| 1,628,889 | 5/1927 | Krantz | 361/356 |
| 3,278,807 | 10/1966 | Galante et al. | 361/355 |
| 3,801,875 | 4/1974 | Morby et al. | 361/355 |
| 3,852,514 | 12/1974 | Lauben | 361/357 |
| 3,858,092 | 12/1974 | Olashaw et al. | 361/346 |
| 4,118,754 | 10/1978 | Duggan | 361/355 |
| 4,167,768 | 9/1979 | Baker et al. | 361/353 |
| 4,167,769 | 9/1979 | Luke et al. | 361/355 |
| 4,449,296 | 5/1984 | Luke et al. | 361/338 |
| 4,536,823 | 8/1985 | Ingram et al. | 361/355 |
| 4,733,329 | 3/1988 | Barner et al. | 361/338 |
| 4,740,865 | 4/1988 | Barner | 361/355 |

Primary Examiner—Gregory D. Thompson
Attorney, Agent, or Firm—James G. Morrow

[57] ABSTRACT

A load center enclosure according to the invention has a unitary plastic frame of uniform cross-section, including a central base pan portion having projections, slots, and the like suitable for mounting bus bars, circuit breakers and neutral bars thereon. The frame also has a rear wall and a pair of opposed side walls which form part of the enclosure, the base pan portion serving as part of the rear wall of the enclosure. A pair of covers are secured to opposite ends of said frame to form top and bottom walls of said enclosure. A door assembly may then be mounted on the front of the enclosure. Such a load center enclosure utilizes an extrudable plastic frame as both a major component of the enclosure and as a base pan for mounting the current-carrying electrical components.

18 Claims, 2 Drawing Sheets

LOAD CENTER ENCLOSURE

TECHNICAL FIELD

The present invention relates generally to devices for the distribution of electrical power and, more particularly, to load center enclosures for home and light-industrial applications.

BACKGROUND OF THE INVENTION

Typical load centers include a metal enclosure having an open face opposite its bottom, wherein an insulative base pan is inserted through the open face and fastened to the bottom. U.S. Pat. No. 4,536,823, issued on Aug. 20, 1985 to Ingram, et al., discloses an extruded insulative base pan mountable within a load center enclosure. FIG. 2 of U.S. Pat. No. 4,536,823 illustrates an insulative base pan 14 within an enclosure (box) 12. This arrangement provides a satisfactory assembly for supporting the bus bars, neutral bars and circuit breakers within the metallic enclosure while also electrically insulating these components from the enclosure. The enclosure, being fabricated from a material such as sheet metal, provides a means of ensuring that any fire which may occur within the enclosure is inhibited from spreading to the exterior of the enclosure.

While this type of load center assembly functions adequately, the cost of manufacturing this assembly is relatively high. This can be attributed to the cost of using sheet metal to form the enclosure, the process of forming the sheet metal enclosure, the process of fabricating the separate base pan, an the labor involved in fastening the base pan within the enclosure. Thus, there remains the need for a load center configuration of a design which can reduce one or more of the material cost, the number of steps required to fabricate the load center, and the number of components from which the load center is assembled.

SUMMARY OF THE INVENTION

A load center enclosure according to the invention has a unitary plastic frame of uniform cross-section, including a central base pan portion having projections, slots, and the like suitable for mounting bus bars, circuit breakers and neutral bars thereon. The frame also has a rear wall and a pair of opposed side walls which form part of the enclosure, the base pan portion serving as part of the rear wall of the enclosure. A pair of covers are secured to opposite ends of said frame to form top and bottom walls of said enclosure. A door assembly may then be mounted on the front of the enclosure to any convenient part of the frame, such as the side walls, or preferably a pair of flanges which extend inwardly from the side walls. The invention further provides an extrudable plastic base pan/frame combination useful in such an enclosure.

BRIEF DESCRIPTION OF THE DRAWINGS

A preferred exemplary embodiment of the invention will be described in conjunction with the appended drawings, wherein like numerals denote like elements, and.

DETAILED DESCRIPTION OF THE PREFERRED EXEMPLARY EMBODIMENT

Figure 1:
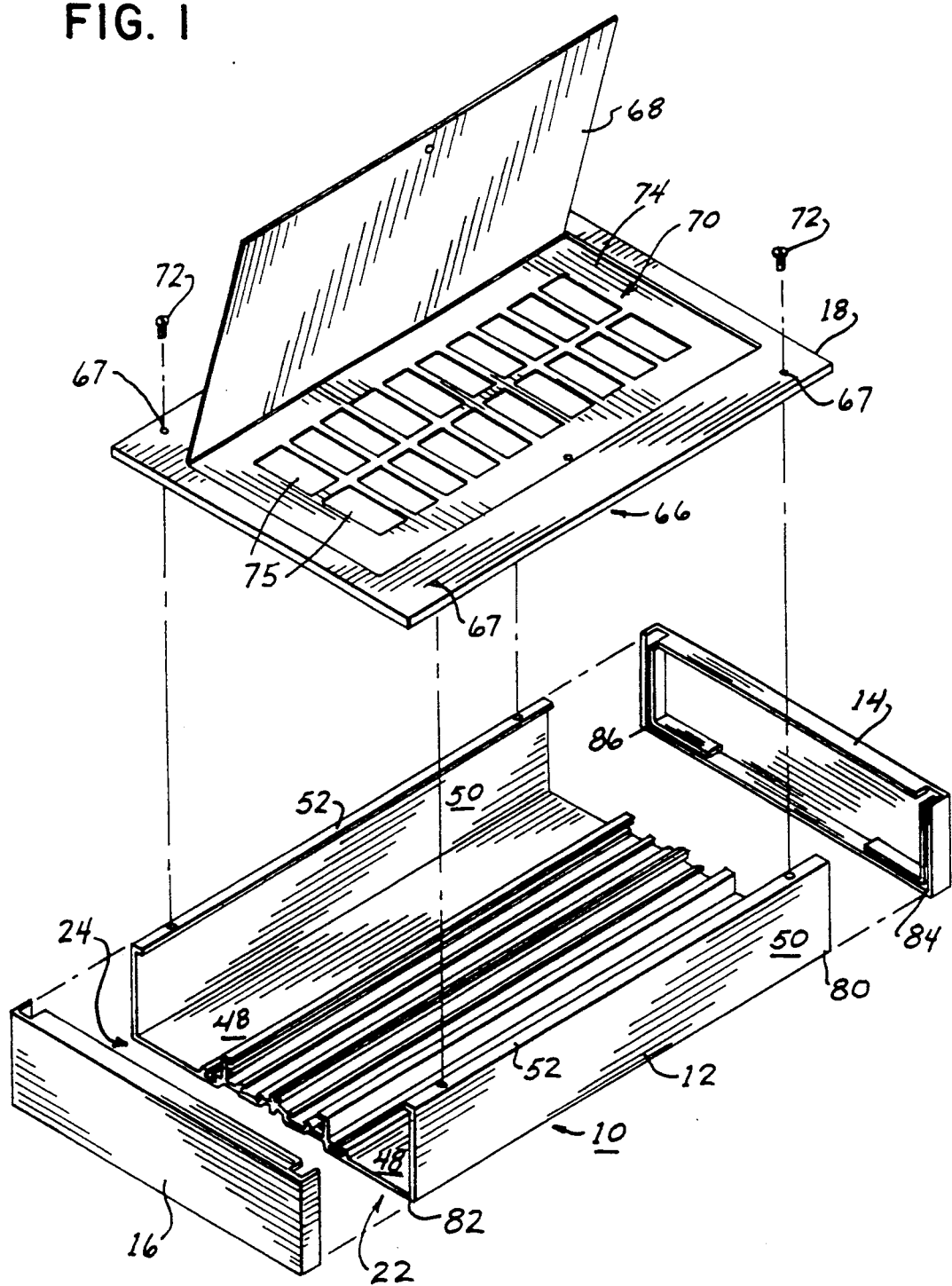
FIG. 1 is an exploded perspective view of a load center to the invention.

Referring to FIG. 1, a rectangular load center enclosure 10 in accordance with the invention comprises a central unitary frame 12, a pair of top and bottom end covers 14, 16 secured to opposite ends of frame 12, and a door assembly 18 mounted on the front of frame 12 to complete the enclosure. Frame 12 has a uniform cross-sectional shape along its length, rendering it suitable for manufacture by conventional extrusion methods.

Figure 2:
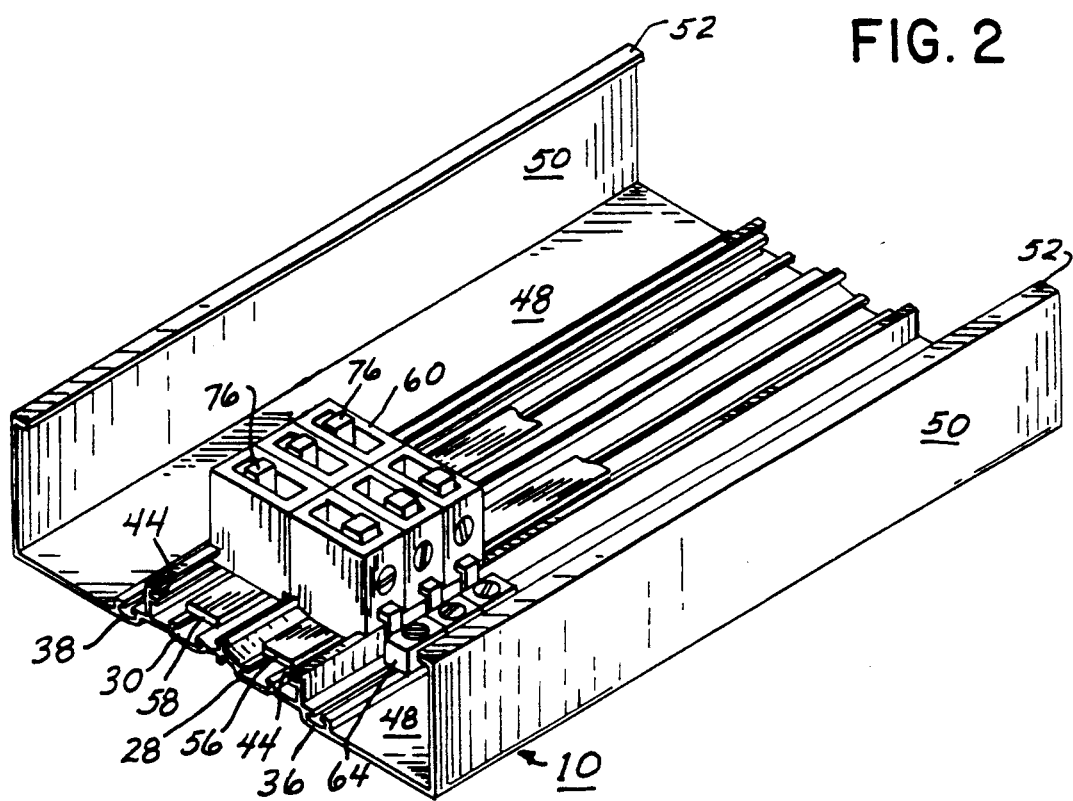
FIG. 2 is an end view of the base pan shown in FIG. 1.

Referring to FIG. 2, frame 12 comprises a central, generally flat base pan portion 20 (within the broken lines 62 in FIG. 2) and a pair of opposed, generally L-shaped side wrapper portions 22, 24 extending from opposite sides of base pan 20. The shape of portion 20 is preferably the same as that of the base pan illustrated in FIG. 3 of U.S. Pat. No. 4,536,823, issued on Aug. 20, 1985, the entire contents of which are incorporated herein by reference. More specifically, portion 20 includes a central insulative rail 26 which is generally Y-shaped in cross-section, a pair of symmetrical lengthwise slots 28 and 30 located on opposite sides of rail 26, a pair of opposed, symmetrical, inwardly extending brackets 32 and 34 located outwardly of slots 28, 30, and a second pair of symmetrical slots 36 and 38 located outwardly of brackets 32 and 34 respectively.

Side wrapper portions 22 and 24 each include a rear wall portion 48, a side wall portion 50 and an inwardly directed flange 52. Rear walls 48 in combination with base pan portion 20 form the rear wall of enclosure 10; no separate base pan-enclosure assembly is required as in the prior art, allowing easier manufacture. Side walls 50 extend from rear walls 48 at right angles and terminate at flanges 52. Flanges 52 extend inwardly a short distance at right angles from walls 50 and are parallel to rear walls 50, such that frame 12 is generally U-shaped in cross-section.

Frame 12 is preferably produced by extruding an electrically non-conductive plastic into the illustrated uniform cross-sectional shape. Suitable plastics include thermoplastic resins stable to about 265° C., such as polyphenylene oxide or acrylonitrile-butadiene-styrene (ABS) resins. One such plastic is Noryl 265 manufactured by General Electric, which combines good mechanical strength, heat resistance, and electrical properties which are maintained at high temperatures.

Frame 12 is fabricated by cutting the extruded plastic member widthwise to a predetermined length. The predetermined length determines the length of the load center and, accordingly, the maximum number of circuit breakers which can ultimately be housed within the load center. Extruded frame 12 is a unitary structure including the base pan, back and side walls for the load center enclosure 10, and a partial front wall thereof.

Figure 3:
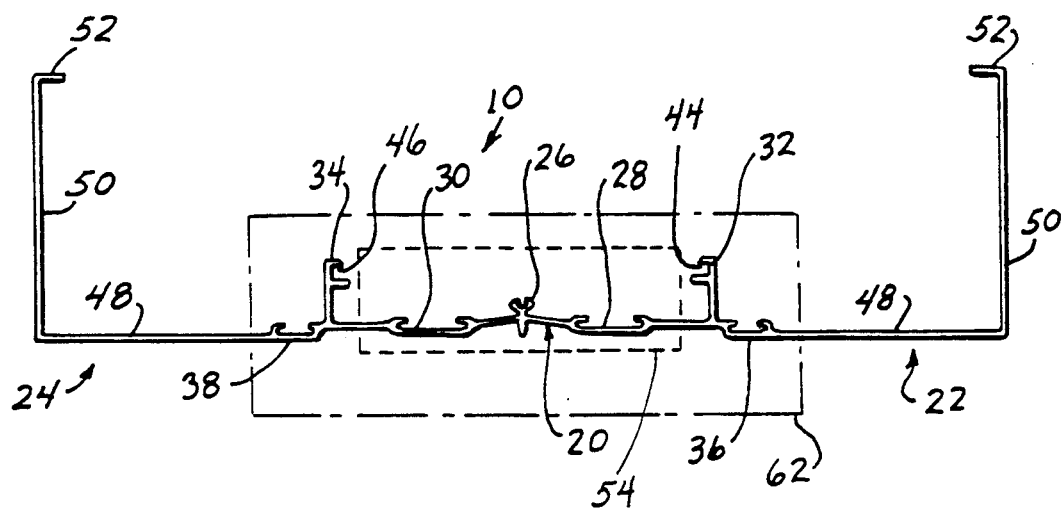
FIG. 3 is a perspective view of a load center according to the invention assembled using the base pan of FIG. 1.

Referring to FIG. 3, load carrying bus bars 56 and 58 are disposed in and engaged with slots 28 and 30, respectively. Slots 36 and 38 similarly receive neutral bars 64. Circuit breakers 60 are mounted in grooves 44 and 46 of brackets 32 and 34, respectively, in contact with bus bars 56, 58 and neutral bars 64 in a manner well known in the art.

Referring again to FIG. 1, load center door assembly 18 comprises a rectangular door frame 66 having a central access opening 70, and a door 68 mounted with hinges (not shown) to frame 66. Frame 66 has holes 67 near its corners and is fastened to flanges 52 by suitable means, such as screws 72, rivets, or other similar fasteners. Frame 66 also includes a recessed circuit breaker cover 74 disposed in opening 70. Cover 74 includes two substantially parallel rows of openings 75 through which switch handles 76 of each circuit breaker 60 are accessible.

End covers 14 and 16 are fastened to opposite ends 80 and 82 of frame 12, respectively. Covers 14 and 16 each include a pair of spaced, L-shaped, double-walled edge portions 84 and 86 for engaging the opposite ends of side wrapper portions 22 and 24, respectively. Once in position, covers 14, 16 can either be ultrasonically welded to frame 12, or fastened to frame 12 by any other suitable means, such as by fasteners or with an adhesive. For welding purposes, covers 14, 16 are preferably injection-molded from a heat-resistant plastic compatible with the plastic of wrapper portions 22, 24, such as ABS or the equivalent.

According to a further embodiment of the invention, frame 12 is produced by coextrusion using known coextrusion methods from at least two different plastics having different properties. Base pan portion 20 must be able to withstand heat generated by the load center, and thus should not melt or distort at temperatures likely to be generated in the enclosure at peak loads. On the other hand, side wrapper portions 22, 24 are not in direct contact with current-carrying parts and can be made of a resin having a lower thermal stability. Both resins should be extrudable at the same temperature and be sufficiently compatible to form a strong bond along the sides of base pan portion 20. The resins should also have high electrical resistance, mechanical strength sufficient for application as an enclosure, and should preferably be self-extinguishing when exposed to flame.

For these purposes base pan portion 20 can be made of a first thermoplastic resin stable up to 265° F., such as a polyphenylene oxide. Side wrapper portions 22, 24 are each made of a coextruded second resin, such as ABS, having lower thermal stability than the first resin, e.g., up to about 200°-225° F. A combination of Noryl 265 base pan portion 20 and an ABS resin side wrapper portions 22 and 24 is preferred.

Referring again to FIG. 2, if frame 12 is coextruded using two electrically non-conductive plastics, at least the portion of frame 12 falling within the dashed lines 54, including slots 28, 30 and rail 26, should be manufactured from a plastic which is stable to 265° F. to avoid degradation as a result of heating due to current flow in bus bars 56, 58. Depending upon the requirements of the load center incorporating frame 12, the portion of frame 12 between lines 54 and 62, including brackets 32, 34 and slots 36, 38, can be made of the first plastic having high thermal stability, the second plastic having less thermal stability, or a third plastic with an intermediate thermal stability, i.e., less than 265° F. but greater than 225° F.

It will be understood that the above description of the preferred exemplary embodiment of the invention, and that the invention is not limited to the specific forms shown. For example, covers 14, 16 and door assembly 18 may be manufactured from any material which meets the applicable codes and standards, such as metal. Additionally, the configuration of the slots and engagement portions may be modified as required by the particular bus bars, neutral bars and circuit breakers used within the load center. Various other substitutions, modifications, changes, and omissions may be made in the design and arrangement of the elements without departing from the spirit of the invention as expressed in the appended claims.

I claim:

1. A load center enclosure, comprising:
   a unitary plastic frame of uniform cross-section along its length including a central base pan portion having means for mounting bus bars, circuit breakers and neutral bars thereon, a rear wall, and a pair of opposed side walls;
   a pair of covers secured to opposite ends of said frame to form top and bottom walls of said enclosure;
   a door assembly; and
   means for securing said door assembly to said frame to from the front of said enclosure.

2. The enclosure of claim 1, wherein said frame has a pair of opposed, inwardly directed flanges at the ends of said side walls remote from said rear wall, and said door assembly is mounted on said flanges of said frame.

3. The enclosure of claim 2, wherein said flanges have holes therein, and said securing means comprises a plurality of fasteners, wherein each fastener is received by a respective hole.

4. The enclosure of claim 3, wherein said door assembly comprises a door frame having a central access opening, a door configured to cover said access opening when closed, and hinge means for mounting said door to said door frame.

5. The enclosure of claim 1, wherein said base pan portion includes, on an inner face thereof:
   a central insulative rail;
   a first pair of slots on opposite sides of said rail for receiving bus bars;
   a pair of brackets on opposite sides of said rail wherein each bracket includes a slot for mounting circuit breakers; and
   a second pair of slots on opposite sides of said brackets outwardly thereof for receiving neutral bars.

6. The enclosure of claim 5, wherein said side walls are spaced from said second pair of slots by said rear wall.

7. The enclosure of claim 6, wherein said side walls extend substantially perpendicularly from said rear wall.

8. The enclosure of claim 1, wherein said covers are made of plastic and are welded to opposite ends of said frame.

9. A generally U-shaped, unitary frame of uniform cross-section made of a heat-resistant, non-electrically conductive plastic, comprising a central base pan portion having means for mounting bus bar, circuit breakers and neutral bars thereon, a rear wall, and a pair of opposed side walls extending from opposite sides of said rear wall, wherein said base pan portion includes, on an inner face thereof:
   a central insulative rail;
   a first pair of slots disposed on opposite sides of said rail for receiving bus bars;
   a pair of brackets on opposite sides of said rail wherein each bracket includes a slot for mounting circuit breakers; and
   a second pair of slots on opposite sides of said brackets outwardly thereof for receiving neutral bars.

10. The frame of claim 9, wherein said side walls are spaced from said second pair of slots by said rear wall.

11. The frame of claim 10, wherein said side walls extend substantially perpendicularly from said rear wall.

12. A generally U-shaped, unitary frame of uniform cross-section along its length made of a heat-resistant, non-electrically conductive plastic, comprising a central base pan portion having means for mounting bus bars, circuit breakers and neutral bars thereon, a rear wall, and a pair of opposed side walls extending from opposite sides of said rear wall, wherein said frame has a pair of opposed, inwardly directed flanges at the ends of said side walls remote from said rear wall, and said flanges have spaced holes wherein each hole is arranged to receive a fastener.

13. A load center enclosure, comprising:
- a unitary plastic frame of uniform cross-section including a central base pan portion having means for mounting bus bars, circuit breakers and neutral bars thereon, a rear wall, and a pair of opposed side walls;
- a pair of covers secured to opposite ends of said frame to form top and bottom walls of said enclosure;
- a door assembly; and
- means for securing said door assembly to said frame to from the front of said enclosure,
- wherein said base pan portion is made of a first plastic and the remainder of said frame is made of a second plastic, wherein said first plastic has greater heat resistance than said second plastic.

14. The enclosure of claim 13, wherein said first plastic maintains its structural integrity up to about 265° F., and said second plastic maintains its structural integrity up to a temperature in the range of 200°-225° F.

15. A generally U-shaped, unitary frame of uniform cross-section along its length made of a heat-resistant, non-electrically conductive plastic, comprising a central base pan portion having means for mounting bus bars, circuit breakers and neutral bars thereon, a rear wall, and a pair of opposed side walls extending from opposite sides of said rear wall,
- wherein said base pan portion is made of a first plastic and the remainder of said frame is made of a second plastic, wherein said first plastic has greater heat resistance than said second plastic.

16. The frame of claim 15, wherein said first plastic maintains its structural integrity up to about 265° F., and said second plastic maintains its structural integrity up to a temperature in the range of 200°-225° F.

17. A method for fabricating an electrical load center, comprising the steps of:
- extruding a heat-resistant, non-electrically conductive plastic in the shape of a frame of uniform cross-sectional shape along its length, said frame having a central base pan portion having means on a front face thereof for retaining electrical load center components thereon;
- cutting the extruded plastic widthwise to form the frame;
- mounting load center electrical components onto said retaining means of said frame;
- mounting a pair of end caps over opposite respective ends of the frame; and
- mounting a door assembly to the front of the frame.

18. The method of claim 17, the step of mounting load center electrical components including mounting bus bars, circuit breakers and neutral bars to said frame.

* * * * *